Figures 5, 6:
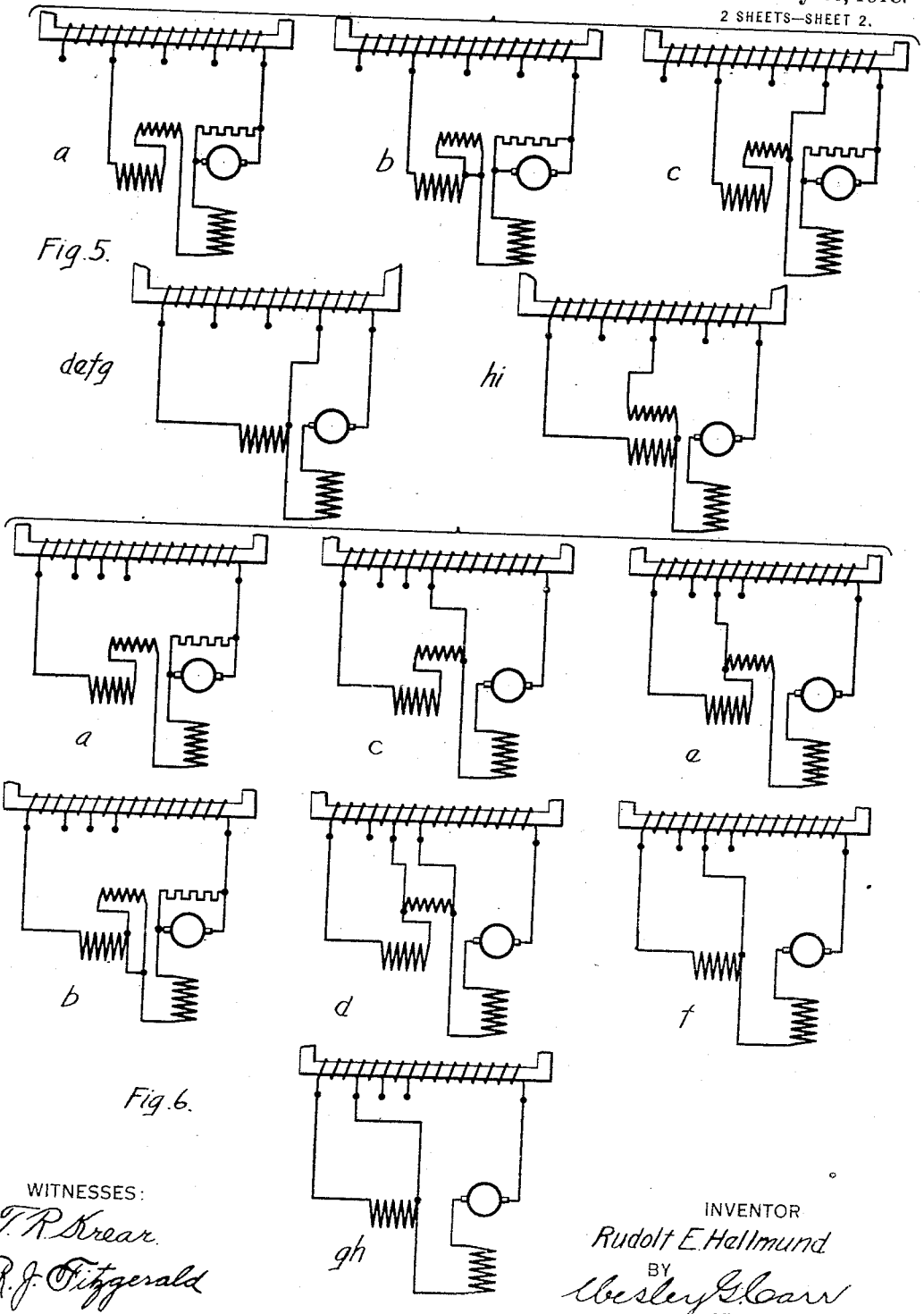

R. E. HELLMUND.
CONTROL SYSTEM FOR ALTERNATING CURRENT COMMUTATOR MOTORS.
APPLICATION FILED MAR. 13, 1916.
1,266,593.
Patented May 21, 1918.
2 SHEETS—SHEET 1.
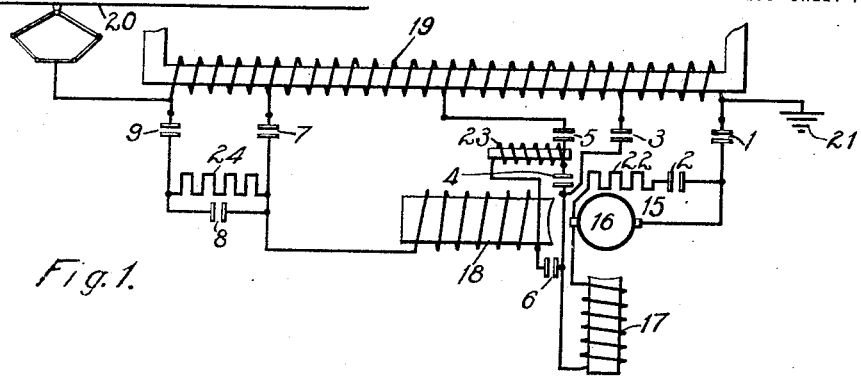
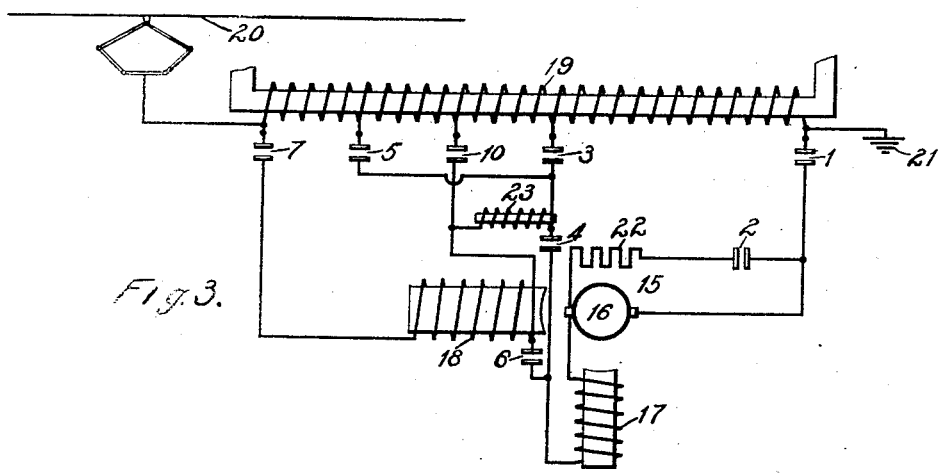
WITNESSES:
R. J. Fitzgerald
D. C. Davis
INVENTOR
Rudolf E. Hellmund.
BY
Wesley G. Carr
ATTORNEY

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

CONTROL SYSTEM FOR ALTERNATING-CURRENT COMMUTATOR-MOTORS.

1,266,593. Specification of Letters Patent. Patented May 21, 1918.

Application filed March 13, 1916. Serial No. 83,778.

*To all whom it may concern:*

Be it known that I, RUDOLF E. HELLMUND, a subject of the Emperor of Germany, and a resident of Pittsburgh, in the county of Allegheny and State of Pennsylvania, have invented a new and useful Improvement in Control Systems for Alternating - Current Commutator-Motors, of which the following is a specification.

My invention relates to systems of control for alternating-current motors of the compensated, commutator type, and it has for its object to provide a system of the character designated whereby the motor may be started and accelerated in a smooth and uniform manner with ample torque, freedom from sparking, and with other desirable operating characteristics.

In the accompanying drawing, Figure 1 is a diagrammatic view of an alternating-current motor of the compensated, commutator type together with its attendant supply and control circuits embodying a preferred form of my invention; Fig. 2 is a sequence chart illustrating the order of switch operation in the circuit of Fig. 1 in accelerating the motor thereof in accordance with my invention; Fig. 3 is a diagrammatic view of a modification of the system shown in Fig. 1; Fig. 4 is a sequence chart setting forth the order of switch operation in the circuit of Fig. 3, Fig. 5 is a group of simplified diagrammatic views illustrating the development of the connections of the system of Fig. 1 when the switches thereof are operated in accordance with the disclosure of Fig. 2; and Fig. 6 is a similar development of the system of Figs. 3 and 4.

In the operation of alternating-current, commutator motors of the compensated type, it is customary to connect the cross and main field windings and the armature winding across a source of alternating-current in substantially the order indicated with an intermediate tap from the source to a point between the cross and main field windings, thus producing what is known as the doubly-fed connection. By adjusting the point of connection of said intermediate tap to the source, the voltage impressed upon the cross field winding may be adjusted with respect to that impressed upon the remaining motor windings and this feature, in conjunction with the well-known transformer action between the armature and cross field windings, enables an extremely effective and flexible control of the amount and phase of the currents in the different portions of the motor circuit to be obtained.

When operating a doubly-fed motor at low speeds, it is desirable that the cross-field winding be quite highly inductive, whereas, when running at high speeds, it is equally desirable that the intermediate connection be quite highly inductive. In accordance with my invention, I combine an inductive device with a doubly-fed commutator motor, inserting said device in series relation with the cross field winding at low speeds and transferring said inductive device to the intermediate tap at higher speeds.

It is customary to start motors, of the type designated, as repulsion motors and still further use is made of said inductive device by connecting it in series with the repulsion motor circuit, whereby the motor voltage is reduced and a greater number of accelerating steps is obtained. Thus, one and the same inductive device is first employed as a current-limiting means during repulsion operation, is then employed to alter the phase of the cross field current during low-speed, doubly-fed operation and is finally employed to alter the phase of the armature and main field currents during high-speed, doubly-fed operation.

Referring to the accompanying drawing for a more detailed understanding of my invention, I show a motor of the compensated commutator type at 15 in Fig. 1, said motor being provided with an armature 16, a main field winding 17 and with a cross-field winding 18. Energy for the operation of the motor 15 may be obtained from any suitable source, such, for example, as an auto-transformer 19 connected between the trolley 20 of a railway system and ground at 21. The outer brush of the armature 16 may be connected to the source 19 through a switch 1, and said armature may be short circuited through a resistor 22 by means of a switch 2 for repulsion operation. The main field winding 17 is connected permanently in series with the armature 16 at its upper terminal, and its lower terminal may be connected to the inner terminal of the cross field winding 18 by means of a switch 6 or may be connected to an intermediate point in the source 19 by the simultaneous closure of switches 4 and 5. An inductive device 23 is permanently connected between a point intermediate the switches 4 and 5 and the inner terminal of the cross-field winding 18. The voltage imposed upon the outer terminal of said cross-field winding may be adjusted by the manipulation of suitable switches 7, 8 and 9 and of a preventive device 24.

Having thus described the arrangement of a system embodying my invention, the accelerating operation is as follows: At the outset, the switches 1, 2, 4, and 7 are closed, as indicated in Fig. 2, establishing the connections shown in Fig. 5$^a$. The three motor windings are connected in series with each other and with the inductive device 23 across a relatively small portion of the source, the voltage impressed upon the outer cross field terminal being a minimum and the armature 16 being short circuited through the device 22 for repulsion operation. The switch 6 is then closed, short circuiting the device 23 as indicated in Fig. 5$^b$. The transition to doubly-fed operation is now performed in the following manner: The switch 3 is first closed and the switch 6 opened, forming the circuit shown in Fig. 5$^c$, a doubly-fed tap producing a small armature voltage being established and the device 23 being inserted in series with the cross-field winding 18 for reducing the current thereof and, consequently, the current of the armature 16. The armature short circuit and the device 23 are next eliminated while raising the voltage imposed upon the outer cross-field tap, all as shown in Fig. 5$^{d,e,f,g}$. Conditions are now suitable for doubly-fed operation, with a relatively low voltage upon the armature and a high voltage upon the cross-field windings, the current of the latter being restricted in amount, however, by reason of the transformer relation to the armature winding. As a final step, the mid tap connection to the source is moved to the left, as shown in Fig. 5$^{h1}$, raising the armature voltage and somewhat reducing the cross-field voltage and, at the same time, the device 23 is inserted in said intermediate tap by opening the switch 4, producing conditions suitable for normal operation, the inductive device 23 producing such phase displacement of the portion of the armature current that returns to the source through the intermediate tap as will beneficially affect the torque and commutating conditions of the motor.

Referring to the form of my invention shown in Fig. 3, the general arrangement of the circuit is as shown in Fig. 1 with the exception that intermediate tap voltages of low and of high value may be obtained through the switches 3 and 5, respectively, while including the device 23 in circuit and a tap voltage of intermediate value may be obtained by closing the switch 10 which also includes said device 23. At the outset, the switches 1, 2, 4, and 7 are closed whereupon, the motor windings are connected in series across the source 19 with the device 23 in series therewith, and the armature 16 is short circuited for repulsion operation. The device 23 is then eliminated from the circuit by the closure of the switch 6, and the switches 2 and 6 are then opened while closing the switch 3, as indicated in position $c$ in Fig. 4, changing over from repulsion to doubly-fed operation with a minimum voltage on the mid tap and with the device 23 in series with the cross-field winding. The switch 10 is then closed and the switch 3 opened, the device 23 acting as a preventive device during this operation and, as a result, the mid tap voltage with respect to the armature is raised and the device 23 is eliminated from the cross-field circuit. In the position 4$^f$, the switch 4 is opened and the switch 6 closed, connecting the field windings 17 and 18 directly in series, and the mid tap connection is then shifted from the switch 10 to the switch 5, using the device 23 as a preventive device. In the final connection shown in Fig. 5$^h$, the switches 1, 5, 6, and 7 are closed, the armature and main field windings being connected in series between the switches 1 and 5, with the cross-field winding connected in series between the switches 5 and 7, the inductive device 23 being connected in the mid-tap connection to the switch 5, as in the previous case.

While I have shown my invention in two of its preferred forms, it will be obvious to those skilled in the art that it is susceptible of various minor changes and modifications without departing from the spirit thereof and I desire, therefore, that only such limitations shall be placed thereupon as are imposed by the prior art or indicated in the appended claims.

I claim as my invention:

1. The combination with a source of alternating currents, of a dynamo-electric machine of the compensated, commutator type, an inductive device, means for initially connecting said machine to said source for operation as a repulsion motor, with said inductive device in series relation with the cross-field winding thereof, means for subsequently operating said motor as a doubly-fed motor, with said inductive device in series with the cross-field winding thereof, and means for finally inserting said inductive device in the intermediate tap of said double-feed connection.

2. The combination with a source of alternating currents, of a dynamo-electric machine of the compensated, commutator type, an inductive device, means for connecting said machine to said source for doubly-fed operation, with the cross-field winding thereof across a portion of said source and in series with said inductive device and with the armature and main field windings thereof across another portion of said source, and means for thereafter inserting said inductive device in an intermediate tap between said motor and said source.

3. The combination with a source of alternating currents, of a dynamo-electric machine of the compensated, commutator type, an inductive device, means for connecting said machine to said source for doubly-fed operation, with said inductive device in series relation with the cross-field winding of said motor, and means for subsequently connecting said inductive device in the intermediate tap between said motor and said source.

4. The combination with a source of alternating currents, of a dynamo-electric machine of the compensated, commutator type, an inductive winding, means for initially connecting said inductive winding in series relation with the cross-field winding of said machine, and means for subsequently connecting said inductive winding in a lead carrying the difference between the armature and cross-field currents of said machine.

5. The combination with a source of alternating currents, of a dynamo-electric machine of the compensated, commutator type, an inductive device, means for initially connecting said inductive device in series relation with the cross-field winding of said machine, and means for subsequently connecting said inductive device in a lead carrying the difference between the armature and cross-field currents of said machine.

In testimony whereof, I have hereunto subscribed my name this 29th day of Feb., 1916.

RUDOLF E. HELLMUND.